United States Patent [19]

Hartman

[11] Patent Number: 4,644,746
[45] Date of Patent: Feb. 24, 1987

[54] GAS COMPRESSOR FOR JET ENGINE

[75] Inventor: Neil W. Hartman, Richfield, Wis.

[73] Assignee: L. W. Fleckenstein, Inc., Brookfield, Wis.

[21] Appl. No.: 814,385

[22] Filed: Dec. 30, 1985

[51] Int. Cl.$^4$ .............................................. F02C 7/12
[52] U.S. Cl. ...................................... 60/269; 60/728; 417/73; 417/151; 417/173
[58] Field of Search ............ 60/726, 728, 269, 39.53, 60/39.58, 39.59; 137/15.1; 417/73, 75, 151, 173, 198

[56] References Cited

U.S. PATENT DOCUMENTS

| | | | |
|---|---|---|---|
| 1,375,601 | 4/1921 | Morize | 60/269 |
| 2,631,774 | 3/1953 | Plummer | 417/151 |
| 2,920,448 | 1/1960 | Coanda | 60/269 |
| 3,323,304 | 6/1967 | Llobet et al. | 60/269 |
| 3,382,679 | 5/1968 | Spoerlein | 60/269 |
| 3,442,086 | 5/1969 | Nieman | 60/269 |
| 3,750,400 | 8/1973 | Sharpe | 60/269 |

*Primary Examiner*—Louis J. Casaregola
*Attorney, Agent, or Firm*—Mann, McWilliams, Zummer & Sweeney

[57] ABSTRACT

A gas compressor is provided having a source of supersonic velocity gases acting to accelerate inlet gases through a mixing region and diffuser. The inlet gas is introduced into the mixing chamber through a converging-diverging nozzle, causing said gas to accelerate to supersonic velocity. An injection of coolant is provided into the resulting gas stream to cause a decrease in its stagnation temperature and an increase in its stagnation pressure. Also provided is a means for modifying the nuclear spin orientations of the gases involved in the mixing region upstream of the combustion chamber to increase the stagnation pressure and decrease the stagnation temperature of the gas flowing into the combustion chamber. The gas compressor can be utilized in a jet engine for producing a flow of pressurized gases which may be expanded through a thrust producing nozzle.

4 Claims, 1 Drawing Figure

GAS COMPRESSOR FOR JET ENGINE

BACKGROUND OF THE INVENTION

Field Of The Invention

This invention relates to the field of gas compressors used in aeropropulsion systems which involve compression of atmospheric air, mixing with fuel and releasing energy in a combustion process to propel a vehicle by means of the resulting thrust.

Most jet propulsion systems rely on turbine machinery to produce initial compression of the inlet air stream. Such systems compress atmospheric air with either axial or radial flow compressors, driven by exhaust products of the combustion process expanding through either radial flow or axial flow gas turbines. These compressions and expansions may occur in several stages, requiring shaft linkage to connect the stages. To protect the turbine components from thermal destruction, limitations are often placed on the temperature of the combustion process through the use of large quantities of excess air, resulting in lower efficiency in terms of fuel consumed versus thrust produced, larger sizes and higher weights, than if higher temperatures were used in the combustion process. Additional safeguards against thermal destruction include the extensive use of alloys containing strategic materials resistant to the high temperatures found in such environments. Such turbine equipment is necessarily complex, resulting in high manufacturing and maintenance costs.

The ram jet is another configuration which is used. In the ram jet, the incoming air is compressed by the relative motion between the atmosphere and the propelled vehicle. This compressed air is then mixed with fuel and ignited, producing thrust. The disadvantages of this system include the fact that the propelled vehicle must be in motion before the engine can be started. In addition, engine efficiency decreases substantially at speeds below Mach 1.5.

Still other configurations of jet engines combine the turbine and ram jet principles, using the turbine compressor at low speeds and ram jet compression of inlet air at high speed. These composite systems do not solve the problems, however, of excess weight, mechanical complexity, high temperature, or low speed operation, all of which are addressed by applicant's invention.

For many years, devices have been in use whereby the stagnation pressure of one gas stream is increased by dynamic interaction with a second gas stream moving at high velocity. Most of these devices are designed so that the driven gas stream interacts with the driving stream at sonic or subsonic velocity, severely limiting the pressure ratio achievable at acceptable mass flow ratios. Some devices utilize supersonic interactions instead. These devices perform adequately when the differences in stagnation temperatures and enthalpys between the two gas streams are small. If, however, the driving gas stream is much more energetic than the driven stream, a sharp drop in pressure ratio is observed. Typically, airborne sources of driving gases are high in temperature and enthalpy compared to ambient conditions. The result is a low overall system pressure ratio while at zero or low forward velocity, with attendent high specific fuel consumption, and low thrust.

Typical of prior art arrangements are the devices disclosed in U.S. Pat. Nos. 2,920,448, 3,323,304, 3,374,631, 3,382,679, 3,750,400, 3,800,529, 3,800,531, 4,379,679. Also of some relevance is French Pat. No. 2,534,983.

SUMMARY OF THE INVENTION

The present invention provides a gas compressor for the compression of atmospheric air or other gas and the introduction of that gas into the combustion chamber of a jet engine. The compressor includes a source for producing a stream of gas flowing at a supersonic velocity and also includes an inlet in the form of a converging-diverging nozzle which is used to control the flow rate and direction of incoming air or gas. Downstream of this nozzle is a mixing chamber in which the flow of supersonic velocity gas moving in the same direction as the incoming air is mixed with the incoming air under partial vacuum conditions. As the gases are mixed, a tertiary fluid flow is introduced into the mixing region to further increase the Mach number of the flow, by lowering its stagnation temperature and increasing its stagnation pressure.

Downstream of the mixing region is a diffuser section which is used to recover the kinetic energy of the gas flow as it proceeds into the engine's combustion chamber. The diffuser consists of a supersonic diffuser section and a subsonic diffuser section coupled by a diffuser throat of reduced cross-sectional area which is sized to prevent the backflow of gases from the high pressure combustion chamber into the mixing region.

In a modified embodiment of the invention, means are provided in the mixing region to modify the nuclear spin orientation of some or all of the matter in this region. This serves to raise the molecules of this matter to a higher energy state, removing heat energy from the environment, thereby further lowering the stagnation temperature and raising the stagnation pressure to increase the system pressure ratio. This modification can be accomplished through the imposition of a magnetic field and/or a radiation field in the mixing region.

DESCRIPTION OF THE PREFERRED EMBODIMENT

Figure 1:
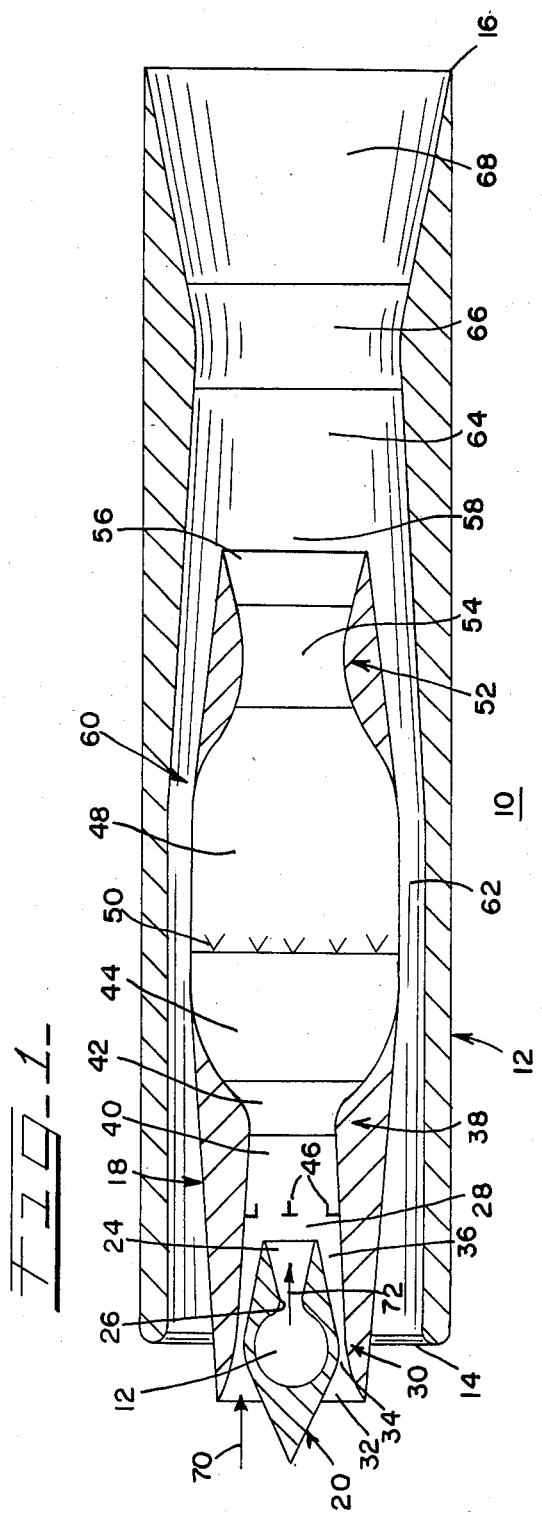
FIG. 1 is a side cross sectional view of an injection-induction jet engine embodying the gas compressor of the present invention.

FIG. 1 shows a jet engine, indicated generally as 10. Housing 12 is cylindrical in shape having a front end 14 and a rear end 16. Located coaxially within housing 12 is induction-combustion section 18 which is rigidly mounted to housing 12 by suitable structural members (not shown).

Located coaxially within the forward end of induction-combustion section 18 is high velocity gas source 20 including combustion chamber 22 and exhaust nozzle 24 which is connected to the combustion chamber 22 by throat 26.

A stream of supersonic velocity gas is generated emanating from source 20. This may arise from chemical reaction of one or more materials in combustion chamber 22 or it may arise from previously compressed and/or heated gases. These gases are accelerated through throat 26 and out exhaust nozzle 24 into a mixing chamber 28. The high velocity flow of gases from source 20 through chamber 28 creates a partial vacuum in the mixing chamber.

The partial vacuum draws air or some other gas 70 through inlet annular converging-diverging nozzle 30 comprising annular converging section 32, throat 34 and diverging section 36 thus accelerating said inlet air as the air's heat energy is converted into kinetic energy. This process is driven by the pressure differential between the outside atmosphere and chamber 28. As the heat energy is converted into kinetic energy and the air is accelerated, the temperature of the inlet air stream decreases.

The absolute pressure in chamber 28 is a function of the mass flow rate, pressure and velocity of gases from source 20; the mass flow rate, velocity and pressure of atmospheric air introduced to chamber 28 through converging-diverging nozzle 30; and the geometry of chamber 28 and diffuser 38.

Located just downstream of region 28 is diffuser section 38 comprising supersonic diffuser 40, throat 42 and subsonic diffuser 44. Injector nozzles 46 are shown located in chamber 28, just upstream of supersonic diffuser 40. In some instances, it may be preferred to locate the nozzles 46 in the diverging section 36 of nozzle 30. A controlled quantity of suitable liquid coolant, discussed below, may be injected into chamber 28 through the injector nozzles. What has been described so far is a gas compressor which is particularly useful in jet engines. The gas compression process is completed when the gas in decelerated in subsonic diffuser 44. The remaining structure which will be described includes the components of the jet engine to which the gas compressor is connected. Immediately downstream of subsonic diffuser 44 is combustion chamber 48 having flame holder assembly 50 at which fuel is injected, ignited and partially burned. The combustion of the fuel and air mixture is completed in combustion chamber 48 which is sufficiently long to permit the complete combustion of the fuel-air mixture.

Immediately downstream of combustion chamber 48 is a converging-diverging nozzle 52 having throat 54 and exhaust nozzle 56. The hot exhaust gases from combustion chamber 48 pass through converging-diverging nozzle 52 into chamber 58, which is a region of partial vacuum due to the high speed of the exiting combustion gases. A controlled quantity of atmospheric air is introduced through annular converging-diverging nozzle 60 located between housing 18 and housing 12 and having throat 62.

Communicating with chamber 58, immediately downstream therefrom, is supersonic diffuser 64, throat 66 and exhaust nozzle 68, through which the exhaust gases finally exit the engine at rear end 16.

While the embodiment just described is shown with fixed geometry nozzles and diffusers, it should be understood that the geometries may be made variable by means well known in the art. For example, the body of source 20 may be moved axially within nozzle 30 to vary the area and mass flow rate at throat 34. Alternatively, an axially translatable spike (not shown) could be located within throat 42 to perform the same function on diffuser 38. The advantage of variable geometry components in a device of this nature, is to permit the device to operate under widely variant conditions (i.e., startup, takeoff, cruise, and climb at different air speeds, altitudes, throttle settings, and temperatures) with reasonable efficiency and stability.

Also highly desirable, from the operational standpoint, are utilization of the well known techniques of boundary layer control. Typically employed will be the methods of boundary layer bleed, through slits, slots, holes, and/or porous construction (not shown), as well as boundary layer energization via slits or nozzles. The advantages here, as elsewhere, include the improved efficiency and stability of diffusers and nozzles as well as a mechanism to control shock wave locations.

OPERATION OF THE PREFERRED EMBODIMENT

A primary flow of inlet atmospheric air or other gas 70 is provided through annular converging-diverging nozzle 30. This primary flow is accelerated through chamber 28 by the secondary flow 72 of exhaust gases produced in source 20. As previously discussed, the supersonic velocity of the secondary flow produces a partial vacuum in region 28 which accelerates the primary flow of inlet air in that region. In this manner, supersonic velocity inlet air flow is provided without the need for turbine machinery or high forward vehicle velocity as used in a ram jet.

A liquid coolant is introduced into region 28 through injector nozzles 46. The liquid coolant may be water or other fluid used simply as a coolant or the fluid introduced through nozzles 46 may be a combustible fluid such as methanol or liquid hydrogen. The latter serve as coolants and as combustible fuels which can further add to the energy released in the combustion chamber 48. The flow of coolant from injectors 46 into region 28 shall be referred to as the tertiary flow.

The major objective of the addition of a tertiary liquid stream into the flow in chamber 28 and supersonic diffuser 40 is to increase the stagnation pressure of the resulting mixed stream. The use of water as a tertiary flow fluid provides excellent cooling properties to decrease stagnation temperature of the mixed flow, which increases the stagnation pressure. Water, however, has no value as a fuel in the combustion process whereas fluids such as liquid methanol and liquid hydrogen could accomplish the desired cooling while contributing energy during the downstream combustion process. In either case, the ratio of tertiary fluid mass flow rate to the mass flow rate of the primary and secondary mixed stream is generally low, in the range of 0.01–0.10. The latent heat of vaporization of the injected liquid at nozzles 46 controls the stagnation temperature and enthalpy of the gases in the region by the removal of heat energy in the vaporization process.

The process of flow cooling in supersonic diffuser 40 and chamber 28 may be enhanced by the modification in this region of the nuclear spin orientations of some or all of the matter in this region. This may be accomplished through the imposition of magnetic and/or radiation fields on the matter in chamber 28 and supersonic diffuser 40. In this manner, the molecules of matter in the flow stream in these regions may be shifted to higher energy levels, taking energy in the form of heat from the environment in the region and thus lowering the matter's stagnation temperature thereby raising its stagnation pressure.

As an example of such nuclear spin reorientation, it is illustrative to consider the two modifications of hydrogen molecules called orthohydrogen and parahydrogen. The distinguishing feature of these two molecules is the relative orientation of the nuclear spin of the individual atoms. The molecules of hydrogen in the region with antiparallel nuclear spins, called parahydrogen, are in the lowest energy state. The hydrogen molecules with parallel nuclear spins, called orthohydrogen, are in a higher energy state. The conversion of stable parahydrogen molecules to higher energy level, orthohydrogen molecules, through the imposition, for example, of a magnetic field, is an endothermic process, removing heat from the environment, further raising the stagnation pressure.

In some uses the secondary flow may be used to start the engine, and upon the attainment of sufficient flow velocity, may be turned off with the supersonic flow maintained by the stagnation temperature reduction process generated in mixing chamber 28 by the tertiary fluid flow alone.

It should be noted that the final pressure and temperature reached after the mixed gas stream passes through diffuser section 38, but prior to the addition of fuel, is strongly dependent upon the ratio of mass flow rates between the inlet air stream 70, the tertiary liquid flow from injectors 46 and the gases from source 20.

After the mixed gas stream has been compressed by its passage through diffuser 38, it is mixed with a suitable combustible material (solid, liquid or gas), and ignited at flame holder 50. The combustion is completed in combustion chamber 48.

The hot pressurized gases from combustion chamber 48 are exhausted through throat 54 of converging-diverging nozzle 52 into a region of partial vacuum 58 just downstream of nozzle 56. This partial vacuum is generated by the passage of these very high velocity gases from nozzle 52 to throat 66 between supersonic diffuser and expansion nozzle 68.

Inlet air is accelerated in annular converging-diverging nozzle prior to its introduction into region 58. The mass flow rate of this inlet air flow is controlled by the geometry of throat 62. This air flow is used to cool the walls of combustion chamber 48, throat 54 and nozzle 56. This acts to increase the mass of exhaust gases flowing through throat 66, which is sufficiently small to prevent back flow from occuring between the atmospheric air at the rear of nozzle 68 and the partial vacuum conditions of region 58. The accelerated mixed gas stream is expanded from throat 66 to the exit of the nozzle 68 to recover its heat energy as kinetic energy. The acceleration of this gas stream results in the generation of thrust.

In the aforementioned description, the very high velocity gases exiting from nozzle 56 may be considered to be analogous to the very high velocity gases exiting from nozzle 24 of source 20, so that one stage of compression- combustion-expansion may be used to drive the compression portion in a succeeding stage.

It is understood that the invention embodied in the above-described example should not be restricted to coaxial geometries or to strictly linear arrangements of components.

The principles of this engine may be used to pump or compress gases, including, but not restricted to air, for purposes other than reaction propulsion in either fixed or mobile applications.

Various features of the invention have been particularly shown and described in connection with the illustrated embodiment of the invention. However, it must be understood that these particular arrangements merely illustrate and that the invention is to be given its fullest interpretation within the terms of the appended claims.

What is claimed is:

1. A gas compressor including:
   (a) a housing defining a passage therethrough, said housing having an inlet and an outlet;
   (b) means disposed near said inlet for producing a stream of gas flowing at supersonic velocity in a direction from said inlet toward said outlet;
   (c) a mixing chamber, internal to said housing, downstream from and in fluid communication with said inlet, which mixing chamber is also in communication with said gas producing means and into which passes said stream of gas;
   (d) a source of liquid coolant and means for injecting said coolant into said mixing chamber to accomplish modification of stagnation enthalpy and temperature of the gases in said mixing chamber;
   (e) a converging, diverging nozzle disposed internal to said housing between and in fluid communication with said housing inlet and said mixing chamber for providing a passage for inlet gases from said inlet to said mixing chamber whereby said supersonic velocity gas stream which flows through said mixing chamber creates a partial vacuum in said mixing chamber causing said inlet gases to flow through said inlet and through said converging, diverging nozzle into said mixing chamber at supersonic velocity;
   (f) a diffuser internal to said housing disposed downstream of and in fluid communication with said mixing chamber, said diffuser including: (1) a supersonic diffuser defining a chamber of decreasing volume; (2) a subsonic diffuser defining a chamber of increasing volume; and (3) a throat connecting said supersonic diffuser and said subsonic diffuser.

2. A gas compressor as in claim 1 including means associated with said mixing chamber to influence the nuclear spin orientation of gas molecules in said mixing chamber whereby to modify the stagnation enthalpy and temperature of the gases in the mixing chamber.

3. A jet engine including:
   (a) a housing defining a passage therethrough, said housing having an inlet and an outlet;
   (b) means disposed near said inlet for producing a stream of gas flowing at supersonic velocity in a direction from said inlet toward said outlet;
   (c) a mixing chamber, internal to said housing, downstream from and in fluid communication with said inlet, which mixing chamber is also in communication with said gas producing means and into which passes said stream of gas;
   (d) a source of liquid coolant and means for injecting said coolant into said mixing chamber to accomplish modification of stagnation enthalpy and temperature of the gases in said mixing chamber;
   (e) a first converging, diverging nozzle disposed internal to said housing between and in fluid communication with said housing inlet and said mixing chamber for providing a passage for inlet gases from said inlet to said mixing chamber whereby said supersonic velocity gas stream which flows through said mixing chamber creates a partial vacuum in said mixing chamber causing said inlet gases to flow through said inlet and through said converging, diverging nozzle into said mixing chamber at supersonic velocity;
   (f) a diffuser internal to said housing disposed downstream of and in fluid communication with said mixing chamber, said diffuser including: (1) a supersonic diffuser defining a chamber of decreasing volume; (2) a subsonic diffuser defining a chamber of increasing volume; and (3) a throat connecting said supersonic diffuser and said subsonic diffuser;

(g) a combusion chamber internal to said housing disposed downstream of and in fluid communication with said subsonic diffuser;

(h) a fuel source in communication with said combustion chamber;

(i) ignition means in communication with said combustion chamber whereby fuel is injected into said combustion chamber from said fuel source and ignited by said ignition means and burned in said combustion chamber, said combustion process also combusting the combination of said high velocity gas stream coolant vapors, and said inlet air which combined products pass from said mixing chamber through said diffuser through said combustion chamber and exit the outlet of said combustion chamber;

(j) a second converging, diverging nozzle internal to said housing disposed between and in fluid communication with said combustion chamber and said outlet of said housing whereby the products of the combustion in said chamber pass through said second converging, diverging nozzle and exit the outlet of said housing, said process of compression, combustion, and expansion producing a resultant force on said housing acting in a direction opposite to the direction of gas flow through said engine.

4. A jet engine as in claim 3 including means associated with said mixing chamber to influence the nuclear spin orientation of gas molecules in said mixing chamber to modify the stagnation enthalpy and temperature of the gases in the mixing chamber.

* * * * *